(12) United States Patent
Stegmiller

(10) Patent No.: US 7,721,875 B2
(45) Date of Patent: May 25, 2010

(54) POWER DRIVE UNIT WITH ECCENTRIC ROLLER LIFT SYSTEM

(75) Inventor: Scott G. Stegmiller, Jamestown, ND (US)

(73) Assignee: Goodrich Corporation, Charlotte, NC (US)

( * ) Notice: Subject to any disclaimer, the term of this patent is extended or adjusted under 35 U.S.C. 154(b) by 137 days.

(21) Appl. No.: 11/776,227

(22) Filed: Jul. 11, 2007

(65) Prior Publication Data

US 2008/0308390 A1 Dec. 18, 2008

Related U.S. Application Data

(63) Continuation-in-part of application No. 11/763,186, filed on Jun. 14, 2007.

(51) Int. Cl.
*B65G 13/02* (2006.01)
(52) U.S. Cl. ................................................ 198/782
(58) Field of Classification Search ............. 198/621.3, 198/782; 193/35 R, 35 SS, 37; 244/137.1; 414/531; 74/567, 570.1, 48, 55; 384/447, 384/255, 91, 565, 543
See application file for complete search history.

(56) References Cited

U.S. PATENT DOCUMENTS

| | | | | |
|---|---|---|---|---|
| 1,366,966 | A * | 2/1921 | Spear | 193/35 R |
| 1,571,557 | A * | 2/1926 | Paul | 384/255 |
| 1,875,180 | A * | 8/1932 | Rider | 74/595 |
| 2,074,588 | A * | 3/1937 | Kipfer | 74/45 |
| 2,812,080 | A * | 11/1957 | Campos | 414/531 |
| 2,836,278 | A * | 5/1958 | Kindell | 193/42 |
| 3,417,628 | A * | 12/1968 | Paul, Jr. | 74/48 |
| 3,504,952 | A * | 4/1970 | Farmer | 384/57 |
| 3,698,539 | A * | 10/1972 | Schwarzbeck | 198/722 |
| 3,712,454 | A * | 1/1973 | McKee | 198/782 |
| 3,737,022 | A * | 6/1973 | DeNeefe et al. | 198/782 |
| 3,978,975 | A | 9/1976 | Herbes et al. | |
| 4,035,044 | A * | 7/1977 | Miyazaki | 384/447 |

(Continued)

FOREIGN PATENT DOCUMENTS

DE 8 816 438 U1 10/1989

(Continued)

OTHER PUBLICATIONS

Official Action from German Patent and Trademark Office (Appln. No. 10 2008 026 296.7-22) dated Jul. 26, 2009.

(Continued)

*Primary Examiner*—Gene Crawford
*Assistant Examiner*—William R Harp
(74) *Attorney, Agent, or Firm*—Womble Carlyle Sandridge & Rice, PLLC

(57) ABSTRACT

A cargo power drive unit (PDU) includes a housing, and a shaft rotatably mounted in the housing. The shaft has a longitudinal axis, an end, and a spindle outwardly extending from the end. The spindle is radially offset from the longitudinal axis. The PDU further includes a lift roller having a center axis, and having an opening that is radially offset from the center axis. The spindle is non-rotatably received in the opening of the lift roller. When the shaft rotates in the housing and the lift roller contacts a stationary support beneath the housing, at least a portion of the housing is lifted away from the stationary support by the roller.

13 Claims, 6 Drawing Sheets

U.S. PATENT DOCUMENTS

| | | | | |
|---|---|---|---|---|
| 4,259,907 A | * | 4/1981 | Schuck | 104/48 |
| 4,401,208 A | * | 8/1983 | Allmacher, Jr. | 198/781.02 |
| 4,505,381 A | * | 3/1985 | Major | 198/781.02 |
| 4,589,542 A | | 5/1986 | Steadman | |
| 4,653,344 A | * | 3/1987 | Nelson | 74/570.3 |
| 4,688,952 A | * | 8/1987 | Setele | 384/537 |
| 4,792,037 A | * | 12/1988 | Huber | 198/788 |
| 5,020,657 A | * | 6/1991 | Huber | 198/782 |
| 5,022,513 A | * | 6/1991 | Huber | 198/782 |
| 5,025,915 A | * | 6/1991 | Huber | 198/782 |
| 5,033,611 A | * | 7/1991 | Huber | 198/782 |
| 5,042,645 A | * | 8/1991 | Pritchard | 198/782 |
| 5,127,513 A | * | 7/1992 | Huber | 198/782 |
| 5,131,527 A | * | 7/1992 | Huber | 198/782 |
| 5,178,472 A | * | 1/1993 | Lawson | 384/537 |
| 5,183,150 A | * | 2/1993 | Chary et al. | 198/782 |
| 5,215,184 A | * | 6/1993 | Huber | 198/782 |
| 5,267,709 A | * | 12/1993 | Koharcheck et al. | 244/137.1 |
| 5,351,808 A | * | 10/1994 | Sundseth | 198/782 |
| 5,503,038 A | * | 4/1996 | Aquino et al. | 74/49 |
| 5,547,069 A | | 8/1996 | Pritchard | |
| 5,568,858 A | | 10/1996 | Thompson | |
| 5,577,846 A | * | 11/1996 | Takahashi | 384/492 |
| 5,632,560 A | * | 5/1997 | Dittenhofer | 384/447 |
| 5,660,268 A | * | 8/1997 | Paauwe et al. | 198/782 |
| 5,661,384 A | * | 8/1997 | Glibbery | 318/471 |
| 5,716,028 A | | 2/1998 | Evans et al. | |
| 5,803,234 A | * | 9/1998 | Podkanski et al. | 198/782 |
| 5,938,003 A | * | 8/1999 | Huber et al. | 198/782 |
| 5,960,934 A | * | 10/1999 | Huber et al. | 198/782 |
| 5,984,615 A | * | 11/1999 | Sundseth | 414/534 |
| 6,051,133 A | * | 4/2000 | Huber et al. | 210/171 |
| 6,135,269 A | | 10/2000 | Huber et al. | |
| 6,328,154 B1 | * | 12/2001 | Huber | 198/782 |
| 6,420,846 B1 | | 7/2002 | Wolfe | |
| 6,834,757 B2 | * | 12/2004 | Holzner et al. | 198/782 |
| 6,834,758 B2 | | 12/2004 | Nguyen et al. | |
| 7,014,038 B2 | | 3/2006 | Leingang et al. | |
| 7,402,973 B2 | * | 7/2008 | Hettwer | 318/563 |
| 2006/0291983 A1 | * | 12/2006 | Konig et al. | 414/391 |
| 2007/0057120 A1 | | 3/2007 | McConnell | |

FOREIGN PATENT DOCUMENTS

DE      41 02 424 C3      8/2000

OTHER PUBLICATIONS

English translation of Official Action from German Patent and Trademark Office (Appln. No. 10 2008 026 296.7-22) dated Jul. 26, 2009.

* cited by examiner

LOWERED/INACTIVE POSITION     RAISED/ACTIVE POSITION

POWER DRIVE UNIT WITH ECCENTRIC ROLLER LIFT SYSTEM

RELATED APPLICATIONS

This application is a continuation-in-part of U.S. application Ser. No. 11/763,186 filed Jun. 14, 2007, the content of which is incorporated by reference in its entirety.

FIELD OF THE INVENTION

The invention relates to onboard cargo handling systems for aircraft, and more particularly relates to a self-lift power drive unit having a compact and lightweight lift system with an eccentric lift roller combined with an eccentric shaft.

BACKGROUND

Items that are shipped by air typically are loaded first onto specially configured pallets or into specially configured containers. In the airfreight industry, these various pallets and containers commonly are referred to as Unit Load Devices ("ULDs"). ULDs are available in various sizes, shapes and capacities.

A ULD typically is loaded with cargo at a location other than the immediate vicinity of an aircraft. Once a ULD is loaded with cargo items, the ULD is weighed, transferred to the aircraft, and is loaded onto an aircraft through a doorway or hatch using a conveyor ramp, scissor lift, or the like. Once inside the aircraft, a ULD is moved within the cargo compartment o its final stowage position. Multiple ULDs are brought onboard the aircraft, and each is placed in its respective stowed position. Once the aircraft reaches its destination, the ULDs are unloaded from the aircraft in a manner that is the reverse of the loading procedure.

To facilitate movement of a ULD within an aircraft cargo compartment as the ULD is loaded, stowed, and unloaded, the deck of an aircraft cargo compartment typically includes a number of raised roller elements. These roller elements often include elongated roller trays that extend longitudinally along the length of the cargo deck, ball transfer units, and the like. For example, roller trays typically include elongated rows of cylindrical rollers that extend in a fore and aft direction. Ball transfer units include plates with upwardly protruding spherical balls. The ULDs sit atop these roller elements, and the roller elements facilitate rolling movement of the ULDs within the cargo compartment. Cargo decks also commonly are equipped with a plurality of power drive units (PDUs). PDUs are electrically powered rollers that can be selectively energized to propel or drive a ULD in a desired direction over a cargo deck's roller elements.

Generally, PDUs can be one of two basic types. A first type of PDU is secured to a cargo deck structure or cargo system such that the rotating axis of the powered drive roller is fixed, and the drive roller can only rotate in two opposed directions within a cargo hold. Such a "fixed" PDU typically is installed within a cargo roller tray, a ball panel, or another aircraft structure such that the PDU's drive roller protrudes above a plane defined by the uppermost portions of adjacent roller elements when the drive roller is in an active position. The drive roller can be either an inflated tire or a rigid roller having a rubber or polymer rim. The rotating tire or roller contacts and grips the bottom of an overlying ULD such that the ULD is driven in a desired direction by traction between the roller and the underside of the ULD. Such stationary PDUs often are configured such that the drive roller can be selectively moved between an active raised position, and a retracted inactive or stowed position. The lifting of the drive roller from the retracted position can be actuated by self-lifting springs, by an electrically powered lift mechanism, or the like. Such fixed PDU's typically are installed at cargo deck locations where a ULD's movement is substantially limited to two opposed directions.

A second type of PDU is known as a "steerable PDU". In a typical steerable PDU, the drive roller is mounted to a rotatable frame or turntable that can be selectively oriented to align the drive roller in a desired direction within a cargo hold. Like the fixed PDUs described above, a steerable PDU can be configured to lift and retract the drive roller between its active raised position and its inactive retracted position. Steerable PDUs usually are installed at cargo deck locations that are proximate to an aircraft's side cargo door, where a ULD may require movement in a direction other than the fore or aft directions as the ULD is being loaded and/or unloaded.

One type of known lift mechanism 10 used in a fixed retractable PDU 60 is schematically shown in FIGS. 1A and 1B. As shown in FIG. 1A, the PDU 60 includes a rigid housing 16 and drive rollers 40. The drive rollers 40 are rotatably mounted in one end of the housing 16, and are driven by a motor disposed within the housing 16 (not shown in FIG. 1A). The opposite end of the housing 16 is pivotally mounted to an aircraft structure by hinge pins 42 that outwardly extend from the sides of the housing 16. In the PDU 60 shown in FIGS. 1A and 1B, the lift mechanism 10 includes a lift roller 30 on each side of the housing. As described in detail below, the lift rollers 30 are rotatably mounted on each end of an eccentric shaft 12. In the retracted position indicated by solid lines in FIG. 1A, each of the lift rollers 30 rests upon a top surface of a stationary reaction plate 70. In this position, the lift rollers 30 support the housing 16 and drive rollers 40 such that the tops of the drive rollers 40 are below the cargo plane 80. When the eccentric shaft 12 is rotated ninety degrees, the lift rollers 30 move downward with respect to the housing 16 and the drive rollers 40, thereby lifting the free end of the housing 16 and the drive rollers 40 to the lifted/active position shown in dashed lines in FIG. 1A. In this lifted/active position, the tops of the drive rollers 40 are above the cargo plane 80.

Details of the lift mechanism 10 are shown in FIG. 1B, which shows the mechanism 10 in a retracted position on the left side of the figure, and shows the mechanism 10 in the raised position. Each end of the shaft 12 outwardly extends from a side of the housing 16, and includes an offset roller spindle 20. As shown in FIG. 1B, each roller spindle 20 has a central axis 24 that is offset from the longitudinal axis 11 of the body of shaft 12 by a distance "a". Circular lift rollers 30 are rotatably mounted on the spindles 20, and can include bearings 32. The lift rollers 30 have spindle receiving openings 34 at their centers, and each has an outer circumference 38 with a radius "r".

In the retracted position shown on the left side of FIG. 1B, the shaft 12 is oriented rotationally such that the offset roller spindles 20 and lift rollers 30 are at an upward-most position relative to the housing 16. The lift rollers 30 sit atop the reaction plate 70, thereby supporting the movable end of the housing 16 at a lowermost position. Accordingly, the drive rollers 40 also are at a lowermost position, and the top surfaces of the rollers 40 are substantially below the cargo plane 80.

In the raised position shown on the right side of FIG. 1B, the shaft 12 is rotated such that the offset roller spindles 20 and lift rollers 30 move toward a lowermost position relative to the housing 16. As the shaft rotates, the lift rollers 30 bear upon the reaction plate 70, thus pushing the movable end of the housing 16 and the drive rollers 40 toward their highest position. Once the shaft 12 has rotated 180 degrees from the lowered position, the top surfaces of the rollers 40 are at or slightly above the cargo plane 80. Accordingly, the drive rollers 40 can be selectively raised and lowered by selectively rotating the shaft 12 between the raised and retracted positions with an electrical motor or other actuator (not shown in the Figs.). As indicated in FIG. 1B, the top surfaces of the drive rollers 40 are lifted a distance "H" by the lift rollers 30. The lift height "H" is a function of the degree of offset "a" between the axes 24 of the roller spindles 20 and the longitudinal axis 11 of the shaft 12.

Though the lift mechanism 10 described above is effective to selectively raise and lower the drive rollers 40, the lift mechanism 10 can have at least one shortcoming. In order to provide a sufficiently large lift height "H", the roller spindle offset distance "a" also must be sufficiently large. Unfortunately, as the roller spindle offset distance "a" increases, the diameter "D" of the body of the shaft 12 also increases, thus also increasing the shaft's weight. The weight of a PDU's shaft 12 substantially contributes to the total weight of the PDU. Because substantial numbers of retractable PDUs often are permanently installed in cargo aircraft, and because total aircraft weight should be minimized, the total weight of each retractable PDU also should be minimized. Accordingly, a desirable property of a retractable PDU is a relatively low total weight, and more particularly, a relatively low lift-shaft weight. Therefore, it is desirable to minimize the weight of a PDU like that shown in FIGS. 1A and 1B by minimizing the diameter and weight of the shaft 12. In addition, because the space available for a PDU on an aircraft is limited, another desirable property of a retractable PDU is a relatively compact size. Therefore, it also is desirable to minimize the diameter of the shaft 12 in order to minimize the overall size of the PDU 60.

Thus there is a need for a relatively lightweight and compact retractable PDU, and more particularly, a need for a retractable PDU having a lift system that includes a shaft having a minimal diameter and a minimal weight.

SUMMARY

In one embodiment, a cargo power drive unit (PDU) includes a housing and a shaft rotatably mounted in the housing. The shaft has a longitudinal axis, a first end, and a first spindle outwardly extending from the first end. The first spindle is radially offset from the longitudinal axis. The PDU further includes a lift roller having a center axis, and having a first opening that is radially offset from the center axis. The first spindle is non-rotatably received in the first opening of the lift roller. When the shaft rotates in the housing and the first lift roller contacts a stationary support beneath the housing, at least a portion of the housing is lifted away from the stationary support by the roller.

In another embodiment, a compact lift system for selectively raising and lowering a drive roller of a power drive unit includes a shaft support and a shaft rotatably supported by the shaft support. The shaft includes a longitudinal axis and an eccentric end having an eccentric axis that is offset from the longitudinal axis by a first distance. A lift roller has a central axis and an opening that is radially offset from the first central axis by a second distance. The first eccentric end of the shaft is non-rotatably received in the first opening of the first lift roller.

In a further embodiment, an eccentric lift roller includes a hub and an outer rim rotatably disposed on the hub. The hub has a center, and includes a mounting opening having a central axis that is non-concentric with the center.

DESCRIPTION

Figure 2:
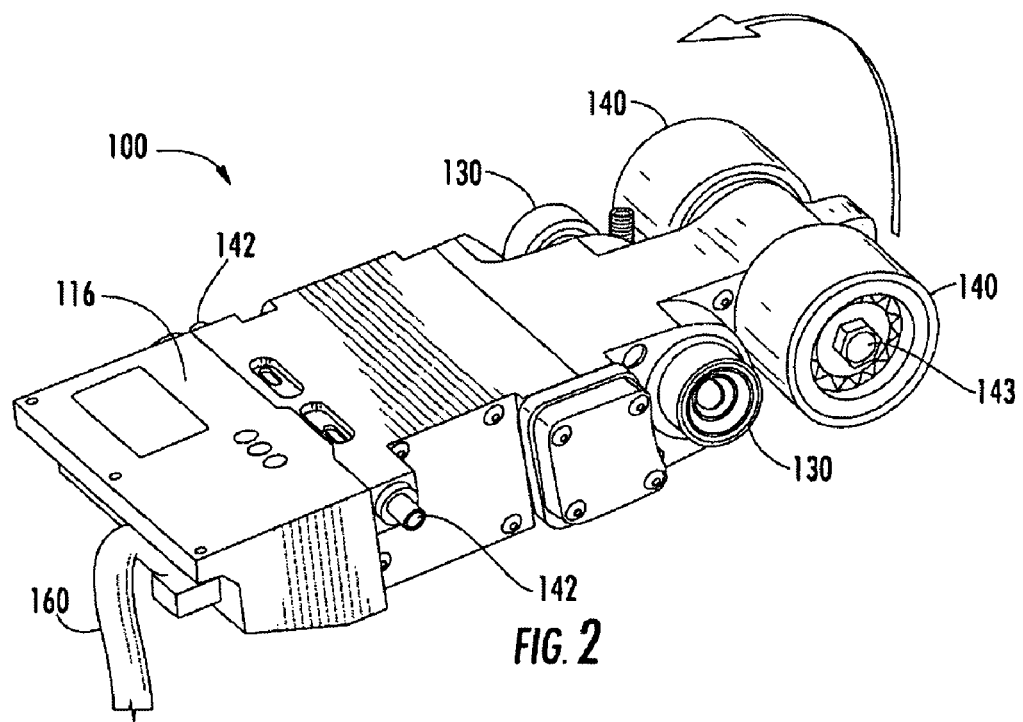
FIG. 2 is a top perspective view of a compact and lightweight power drive unit according to the invention having a compact and lightweight lift system according to the invention.
Figure 3:
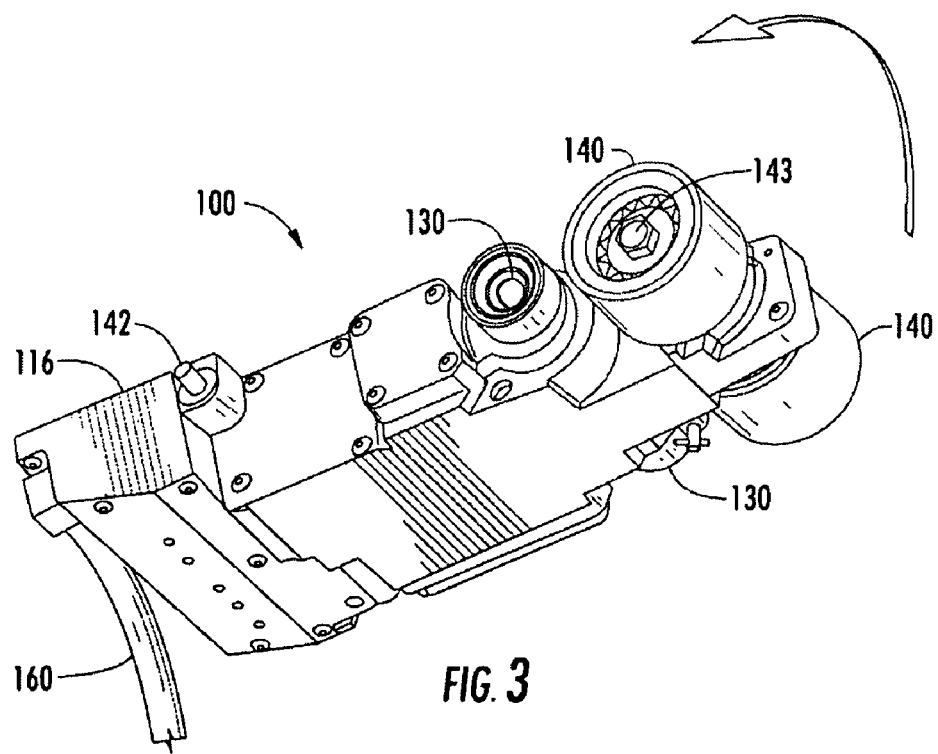
FIG. 3 is a bottom perspective view of the PDU shown in FIG. 2.

One embodiment of a compact and lightweight retractable PDU 60 according to the invention is shown in FIGS. 2-7. As shown in FIGS. 2 and 3, in one embodiment of a retractable PDU 100 according to invention, the PDU 100 includes a substantially rigid housing 116 having a pair of opposed and aligned hinge pins 142 outwardly extending from the sides on one end of the housing 116. On an opposite end of the PDU 100 from the hinge pins 142, the PDU 100 includes at least one drive roller 140 rotatably mounted in the housing 116. In the embodiment shown, the PDU 100 includes a pair of spaced drive rollers 140, though a PDU according to the invention can alternatively include fewer or more drive rollers 140. The drive rollers 140 can be mounted on a common shaft 143 as shown in FIGS. 2 and 3. In this embodiment, the end of the housing 116 that includes the drive rollers 140 includes one or more eccentric lift rollers 130. The eccentric lift rollers 130 operate to selectively lift or lower the non-hinged end of the housing 116 and the associated drive rollers 140. In FIGS. 2 and 3, the lift rollers 130 are shown in a position associated with the PDU in a retracted position. The PDU 100 can include one or more cords or wires 160 for supplying electric power and/or command information to the PDU 100.

Figure 4:
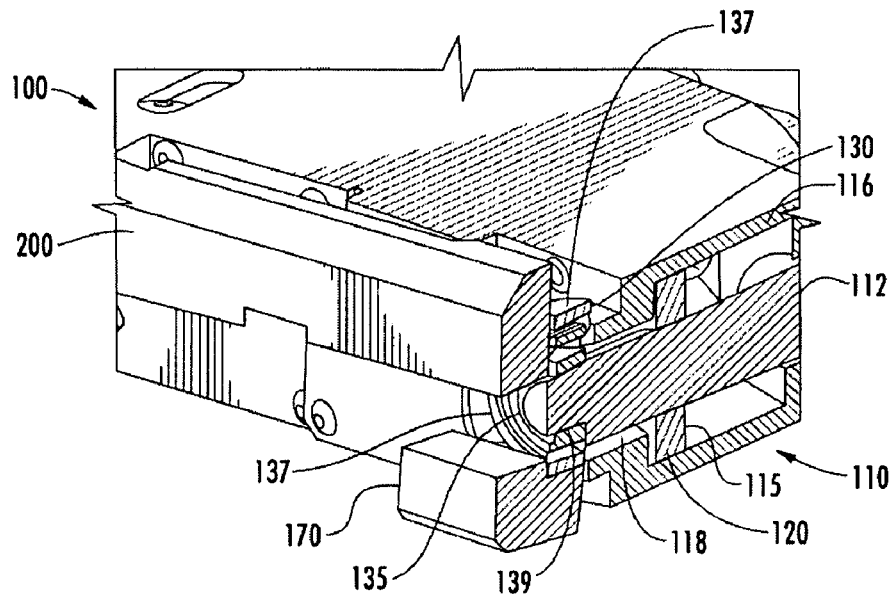
FIG. 4 is a side perspective view of the PDU shown in FIGS. 2 and 3 with a portion of the PDU removed to show details of the lift system.
Figure 5:
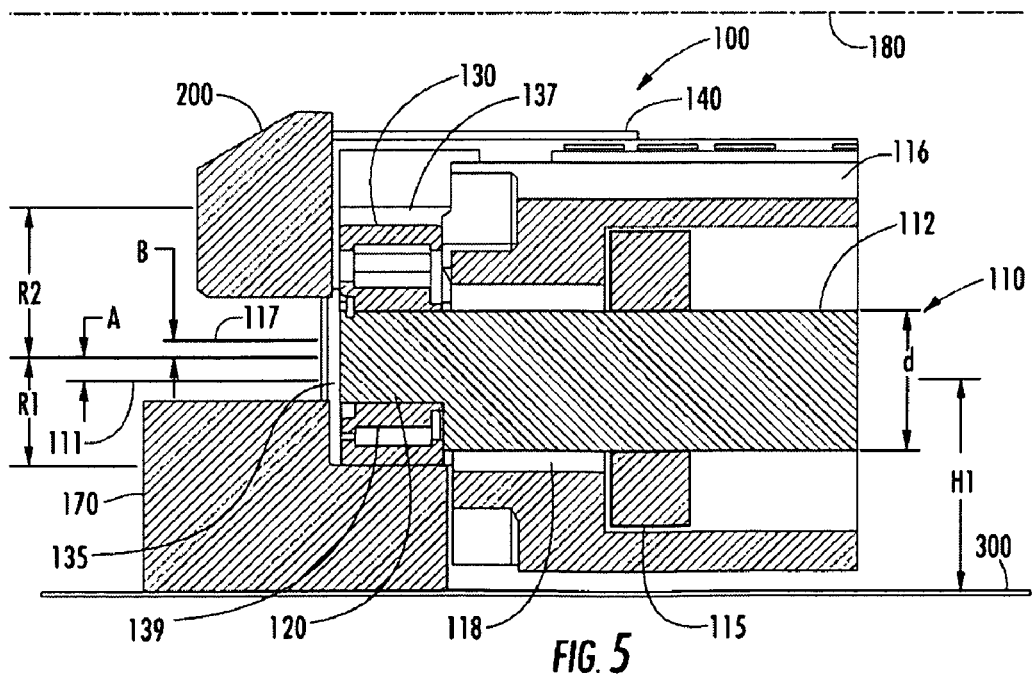
FIG. 5 is a partial cross-sectional view of the PDU shown in FIGS. 2-7 taken along line 5-5 in FIG. 7 and showing the lift system in a retracted position.
Figure 6:
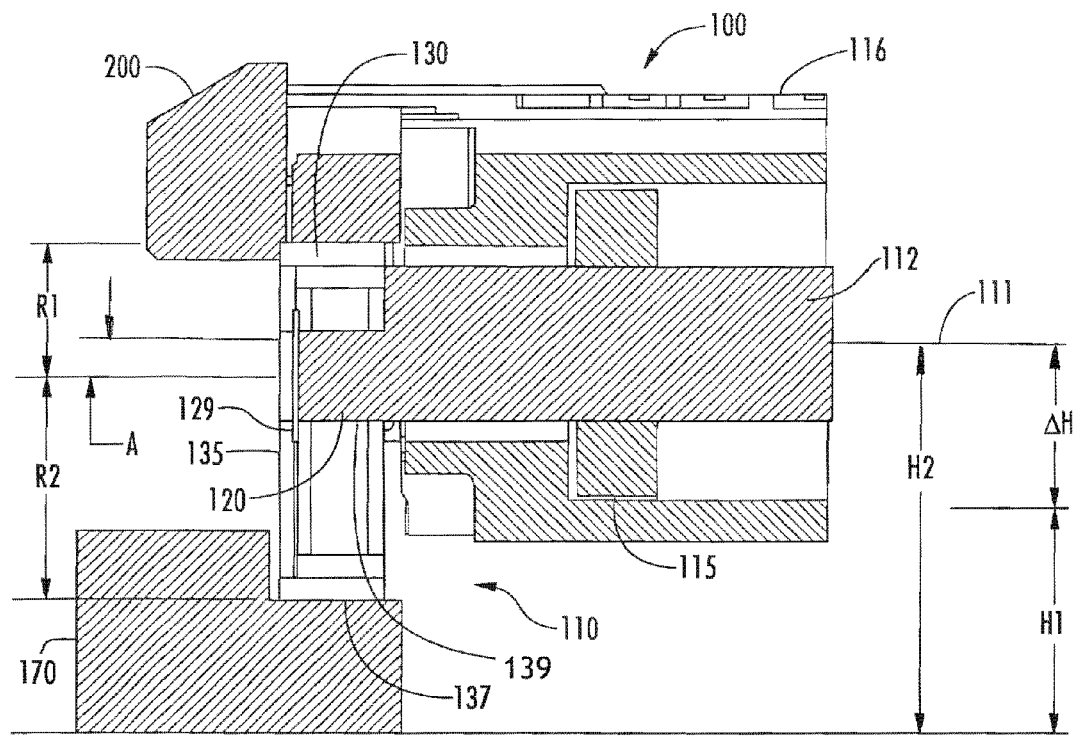
FIG. 6 is another partial cross-sectional view of the PDU shown in FIGS. 2-7 taken along line 5-5 in FIG. 7 and showing the lift system in a raised position.

Details of one embodiment of a compact and lightweight lift system 110 for use in the PDU 100 are shown in FIGS. 4-6. In this embodiment, the lift system 110 includes a shaft 112 that is rotatably mounted in the substantially rigid housing 116. As shown in FIGS. 4-6, ends of the shaft 112 can be rotatably supported in the housing 116 by bearings 118. As shown in FIGS. 4-6, the ends of the shaft 112 include roller spindles 120. As shown in FIGS. 5 and 6, the roller spindles 120 are radially offset from a primary longitudinal axis 111 of the shaft 112 by a distance "A". Eccentric rollers 130 are non-rotatably mounted on the spindles 120. In the embodiment shown, the eccentric rollers 130 have substantially cylindrical outer surfaces 137. The spindles 120 of the shaft 112 are matingly received in openings 139 in roller hubs 135 that extend at least partially through the rollers 130. As shown in FIG. 6, the rollers 130 can be retained on the spindles 120 by retainer rings 129. As shown in FIG. 5, the centers of openings 139 in the hubs 135 are radially offset from the central axis 117 of the eccentric rollers 130 by a distance "B". Additional details of the eccentric rollers 130 are discussed below. The shaft 112 can also include a drive gear 115 for engagement with a motor or other actuator (not shown in the drawings).

Operation of the lift system 110 is described with reference to FIGS. 5 and 6. In FIG. 5, the lift system 110 is shown in a retracted position. In this position, the lowermost outer edges of the eccentric lift rollers 130 are at their uppermost elevation relative to the housing 116. In this position, the non-hinged end of the housing 116 and the drive rollers 140 connected thereto are supported by the eccentric lift rollers 130 at their lowest position relative to the reaction plates 170, and the uppermost surfaces of the drive rollers 140 are substantially below the cargo plane 180. In this position, the primary longitudinal axis 111 of the shaft 112 is positioned at a height "H1" above a stationary support surface 300.

In FIG. 6, the lift system 110 is shown in a raised position. In this position, the lowermost outer edges of the eccentric lift rollers 130 are at their lowermost elevation relative to the housing 116. In this position, the non-hinged end of the housing 116 and the drive rollers 140 connected thereto are supported by the eccentric lift rollers 130 at their highest position relative to the reaction plates 170, and the uppermost surfaces of the drive rollers 140 are above the cargo plane 180. In this position, the primary longitudinal axis 111 of the shaft 112 is positioned at a height "H2" above a stationary support surface 300. Accordingly, the lifting system is capable of lifting the shaft 112 by a vertical distance ΔH that is equal to H2 minus H1. Accordingly, the drive rollers 140 also are lifted a vertical distance that is substantially equal to ΔH by the shaft 112 and eccentric lift rollers 113. As can be seen in the embodiment shown in FIGS. 5 and 6, the offset of the spindle 120 from the longitudinal axis 111 of the shaft 112 and the offset of the first opening 139 from the central axis 117 of the roller 130 are in substantially opposite directions for all rotational positions of the shaft 112 as the shaft 112 rotates in the housing 116.

Figure 7:
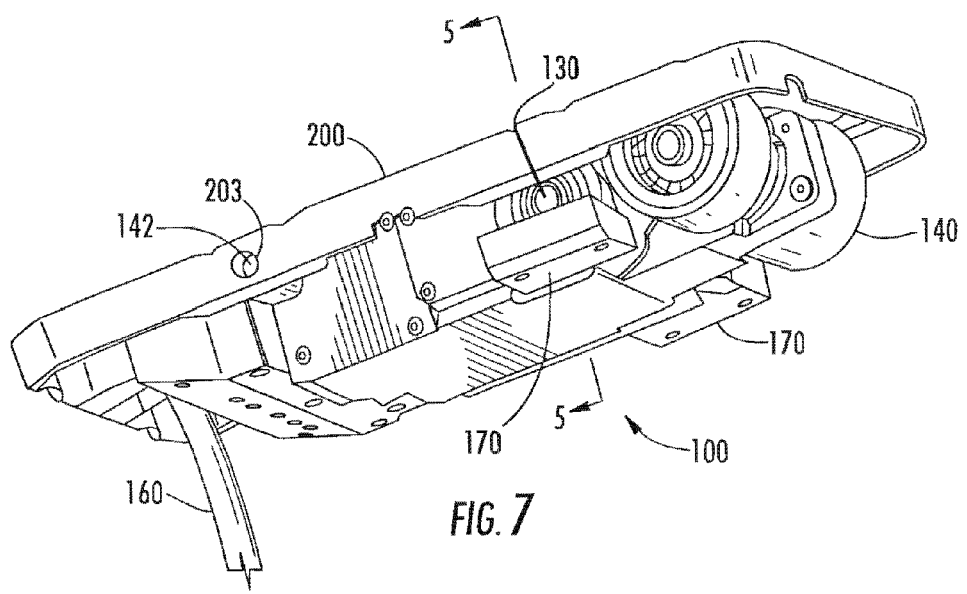
FIG. 7 is a bottom perspective view of the PDU shown in FIGS. 2-6 with the PDU pivotally mounted in a support frame.

As shown in FIG. 7, the retractable PDU 100 can be mounted to an aircraft by a PDU support frame 200. In the embodiment shown, the support frame 200 has a substantially rectilinear shape that surrounds an upper portion of the PDU 100. The opposed hinge pins 142 of the PDU 100 are pivotally received in opposed openings 203 in the frame 200, thereby permitting pivotal movement of the PDU 100 relative to the support frame 200. The center of the frame 200 is open to permit the drive rollers 140 of the PDU to upwardly extend above the frame 200. The PDU support frame 200 can be fixedly secured to a fixed portion of an aircraft proximate to a cargo deck, such as to a roller tray or the like.

Figure 8:
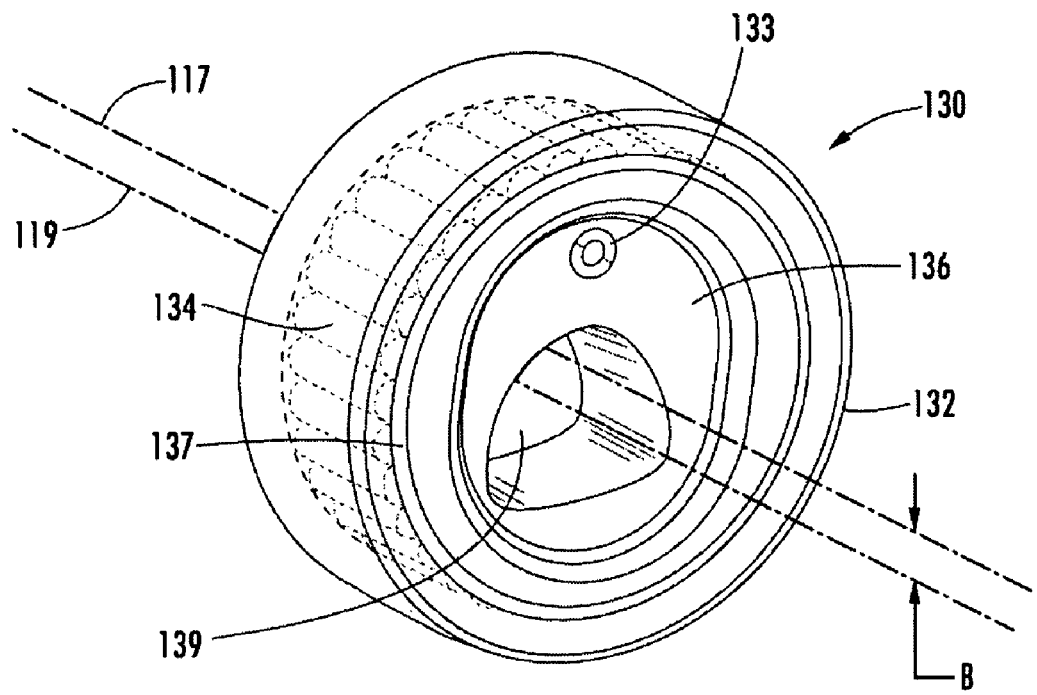
FIG. 8 is an outside perspective view of an eccentric lift roller according to the invention for use in the PDU shown in FIGS. 2-7 with the outer rim shown in phantom.
Figure 9:
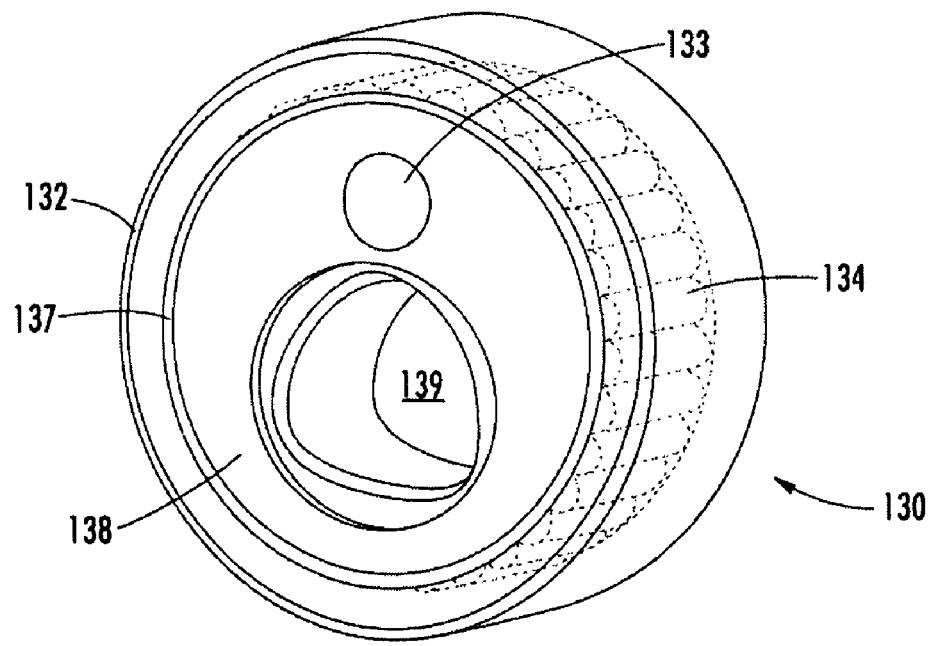
FIG. 9 is an inside perspective view of the eccentric lift roller shown in FIG. 8 with the outer rim shown in phantom.

One embodiment of an eccentric lift roller 130 according to the invention is shown in FIGS. 8 and 9. In this embodiment, each eccentric lift roller 130 includes a rotatable outer rim 132, a set of bearings 134, and a hub 137. In the embodiment shown, the hub 137 includes an outer plate 136, and a cooperating inner plate 138. The outer plate 136 and inner plate 138 cooperate to seal the bearings 134 within the roller 130. As shown in FIGS. 8 and 9, the outer plate 136 and the inner plate 138 can be connected by a rivet 133, or any other connecting device or securing means. Alternatively, the hub 137 can be constructed in a single piece, or in more than two pieces. The outer rim 132 is substantially free to rotate about the hub 137 on the bearings 134.

As shown in FIGS. 8 and 9, the hub 137 includes an opening 139 that at least partially extends through the hub 139. In the embodiment shown, the opening 139 extends through the entire hub 137. In one embodiment, the opening 139 has a non-circular and non-cylindrical shape. In the embodiment shown in FIGS. 8 and 9, the opening 139 has a substantially polygonal shape, and in particular, has a three-sided polygonal shape. Alternatively, the non-circular shape of the opening 139 can be any shape that prevents rotation between the hub 137 and a mating shaft having a closely corresponding shape. When the roller has a polygonal or other non-circular opening like that shown in FIGS. 8 and 9, the mating spindles 120 on the shaft 112 of the PDU 100 have a substantially similar mating cross-sectional profile that provides non-rotating engagement between the spindles 120 and hubs 137. Alternatively, the spindles 120 and roller openings 139 can be circular, and the spindles 120 can be keyed to, or otherwise non-rotatably engaged with or connected to the hubs 137.

Figure 1A:
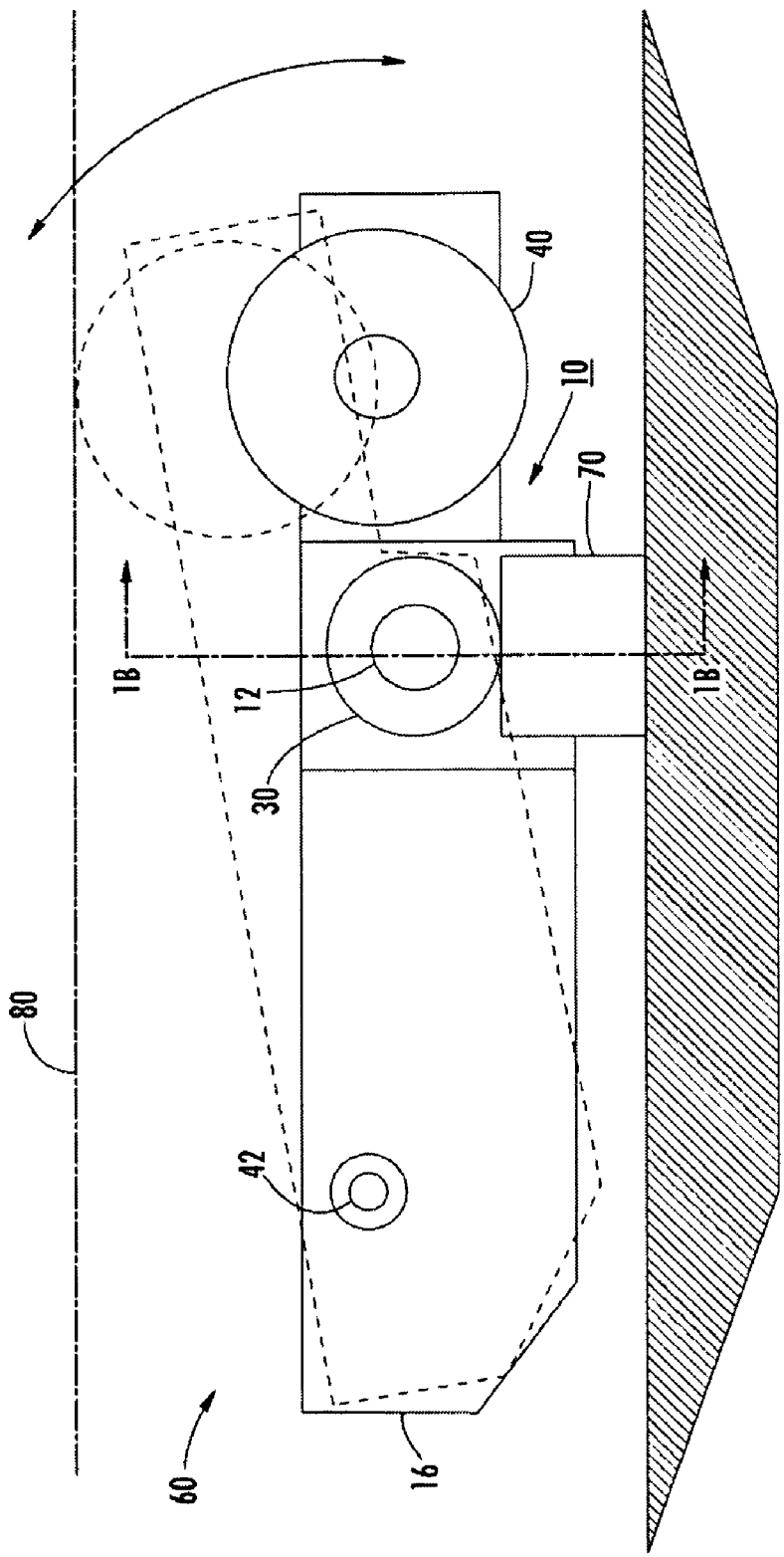
FIG. 1A is a side elevation view of a prior art retractable power drive unit.
Figure 1B:
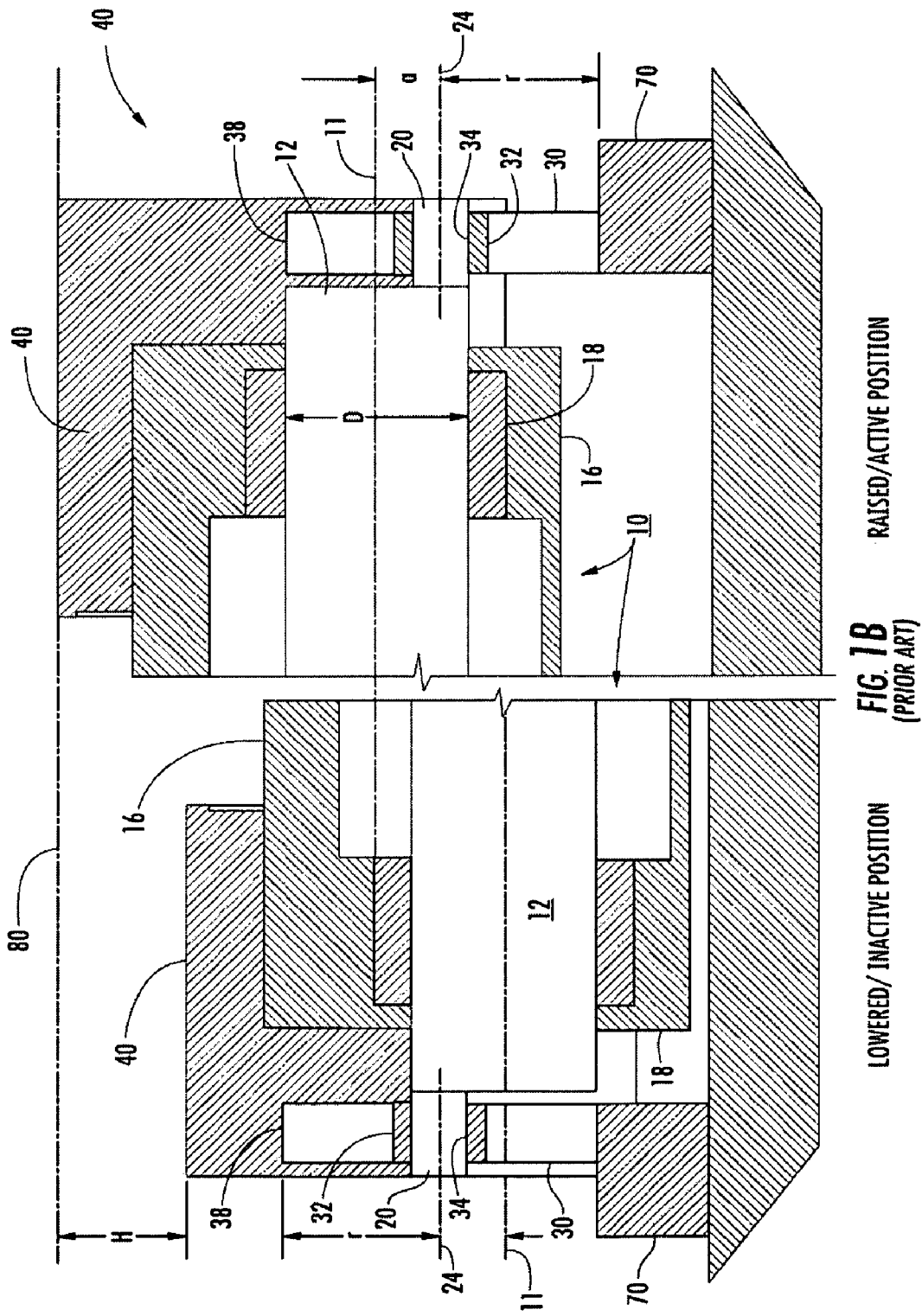
FIG. 1B is cross-sectional view of the retractable power drive unit shown in FIG. 1A taken along line 1B-1B.

As indicated in FIG. 5, the body of shaft 112 in one embodiment of a lift system 110 and PDU 100 according to the invention has a principal outer diameter "d". This diameter "d" is substantially smaller than the principal outer diameter "D" for the shaft 12 of the prior art lift system 10 shown in FIG. 1B. As shown in FIG. 5, the total lift roller offset for lift system 110 is the sum of the radial spindle offset "A" of the shaft 12, and the radial offset "B" of opening 139 in the lift roller 130. Accordingly, the total lift roller offset (i.e. A+B) is shared between the shaft 112 and the rollers 130. Thus, unlike the large-diameter shaft 12 of the prior art lift mechanism 10 shown in FIGS. 1A and 1B (having a large primary diameter "D"), the shaft 112 in a lift mechanism 10 according to the invention can be substantially smaller in diameter than the shaft 12 of the prior art mechanism 10 (i.e. d<D). Accordingly, the shaft 112 can be substantially smaller in both overall size and weight, and can substantially contribute to reducing the overall size and weight of a retractable PDU 100 having an improved lift system 110 according to the invention, as compared to a prior art PDU 60 having a prior art lift mechanism 10 like that described in the background section above.

The invention has been described above in relation to at least one embodiment of the invention having particular features, characteristics, or aspects. Persons of ordinary skill in the art will recognize from a reading of the above description that certain changes or modifications can be made to the described embodiment(s) without departing from the invention. For example, though the invention has specifically been described in relation to a fixed, non-steerable PDU, a lift system with an eccentric roller according to the invention can be readily adapted to a steerable PDU. These and other such changes and modifications are intended to be within the scope of the appended claims.

What is claimed is:

1. A cargo power drive unit comprising:

(a) a housing;

(b) a shaft rotatably mounted in the housing, the shaft having a longitudinal axis, a first end, and a first spindle outwardly extending from the first end and being offset from the longitudinal axis; and (c) a first lift roller having a hub with a first center axis, a first opening that is radially offset from the first center axis, and an outer rim rotatably disposed on the hub, the first spindle being non-rotatably received in the first opening;

(d) wherein the spindle is offset from the longitudinal axis in a first direction and the first opening is offset from the first center axis in a second direction that is substantially opposite from the first direction, and wherein the offset of the spindle and the offset of the first opening remain in substantially opposite directions for all rotational positions of the shaft as the shaft rotates in the housing.

2. A cargo power drive unit according to claim 1 wherein the shaft further includes a second end and a second spindle outwardly extending from the second end, and further comprising a second lift roller having a second center axis and a second opening that is radially offset from the second center axis, the second spindle being non-rotatably received in the second opening.

3. A cargo power drive unit according to claim 1 wherein the outer rim is rotatably supported on the hub by bearings.

4. A cargo power drive unit according to claim 1 wherein the rotatable outer rim has an outer circumference and further comprises a rigid material on the outer circumference.

5. A cargo power drive unit according to claim 1 wherein the first spindle and the first opening have mating non-circular shapes.

6. A cargo power drive unit according to claim 1 wherein the first opening extends through the first lift roller and the first lift roller is retained on the first spindle by a retainer ring.

7. A cargo power drive unit according to claim 1 and further comprising a lift block positioned beneath the first lift roller.

8. A compact lift apparatus for selectively raising and lowering a power roller of a power drive unit, the apparatus comprising:

(a) a shaft support;
(b) a shaft rotatably supported by the shaft support and having a longitudinal axis and a first eccentric end having a first eccentric axis that is offset from the longitudinal axis by a first distance; and
(c) a first lift roller having a hub with a first central axis and a first opening, the first opening being offset from the first central axis by a second distance, and an outer rim rotatably disposed on the hub;
(d) wherein the first eccentric end of the shaft is non-rotatably received in the first opening of the first lift roller, wherein the first eccentric axis is offset from the longitudinal axis in a first direction, and the first opening is offset from the first central axis in a second direction that is substantially opposite from the first direction, and wherein the offset of the first eccentric axis and the offset of the first opening are offset in substantially opposite directions for all rotational positions of the shaft as the shaft rotates in the shaft support.

9. A lift apparatus according to claim 8 wherein the shaft further includes a second eccentric end having a second eccentric axis that is offset from the longitudinal axis by the first distance; and further comprising a second lift roller having a second central axis and a second opening, the second opening being offset from the second central axis by a second distance; wherein the second eccentric end of the shaft is non-rotatably received in the second opening of the second lift roller.

10. A lift apparatus according to claim 8 wherein the outer rim is rotatably supported on the hub by bearings.

11. A lift apparatus according to claim 8 wherein the rotatable outer rim has an outer circumference and further comprises a rigid material on the outer circumference.

12. A lift apparatus according to claim 8 wherein the first eccentric end and the first opening have mating non-circular shapes.

13. A lift apparatus according to claim 8 wherein the first opening extends through the first lift roller, and the first lift roller is retained on the first eccentric end by a retainer ring.

* * * * *